R. & C. D. MUNGER.
BEAN HARVESTER.
APPLICATION FILED MAR. 23, 1918.
1,295,822.
Patented Feb. 25, 1919.
4 SHEETS—SHEET 4.
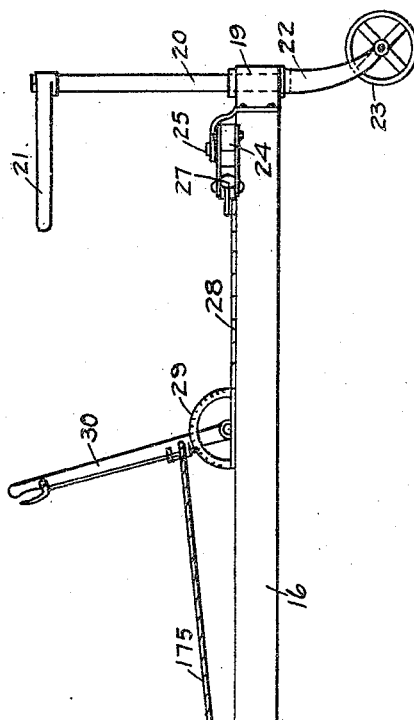
Fig. 2.A.
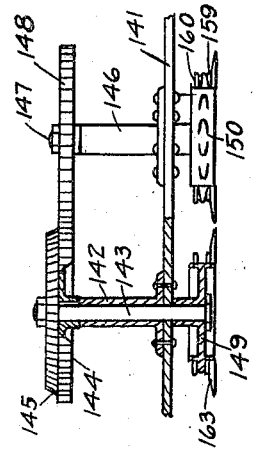
Fig. 8.
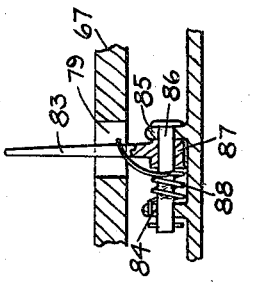
Fig. 7.
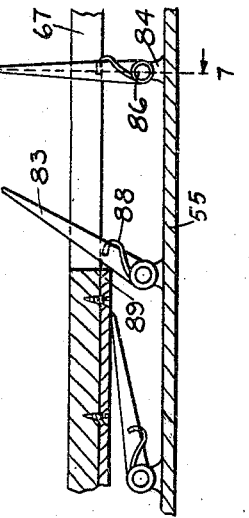
Fig. 6.
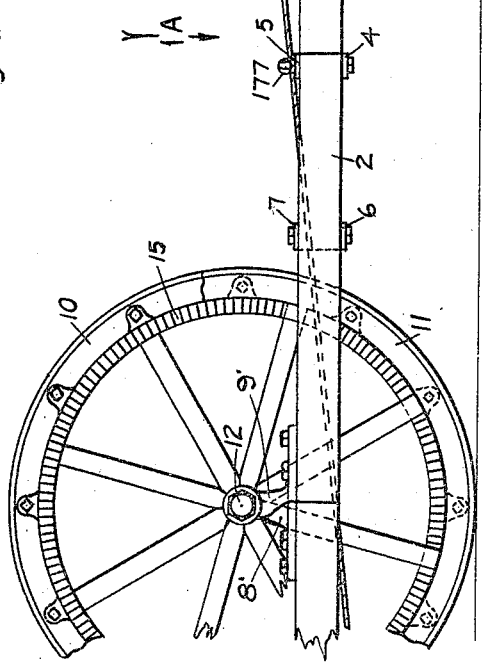
Inventors:
Ross Munger,
Calvin D. Munger,
by Hazard & Miller
Att'ys.

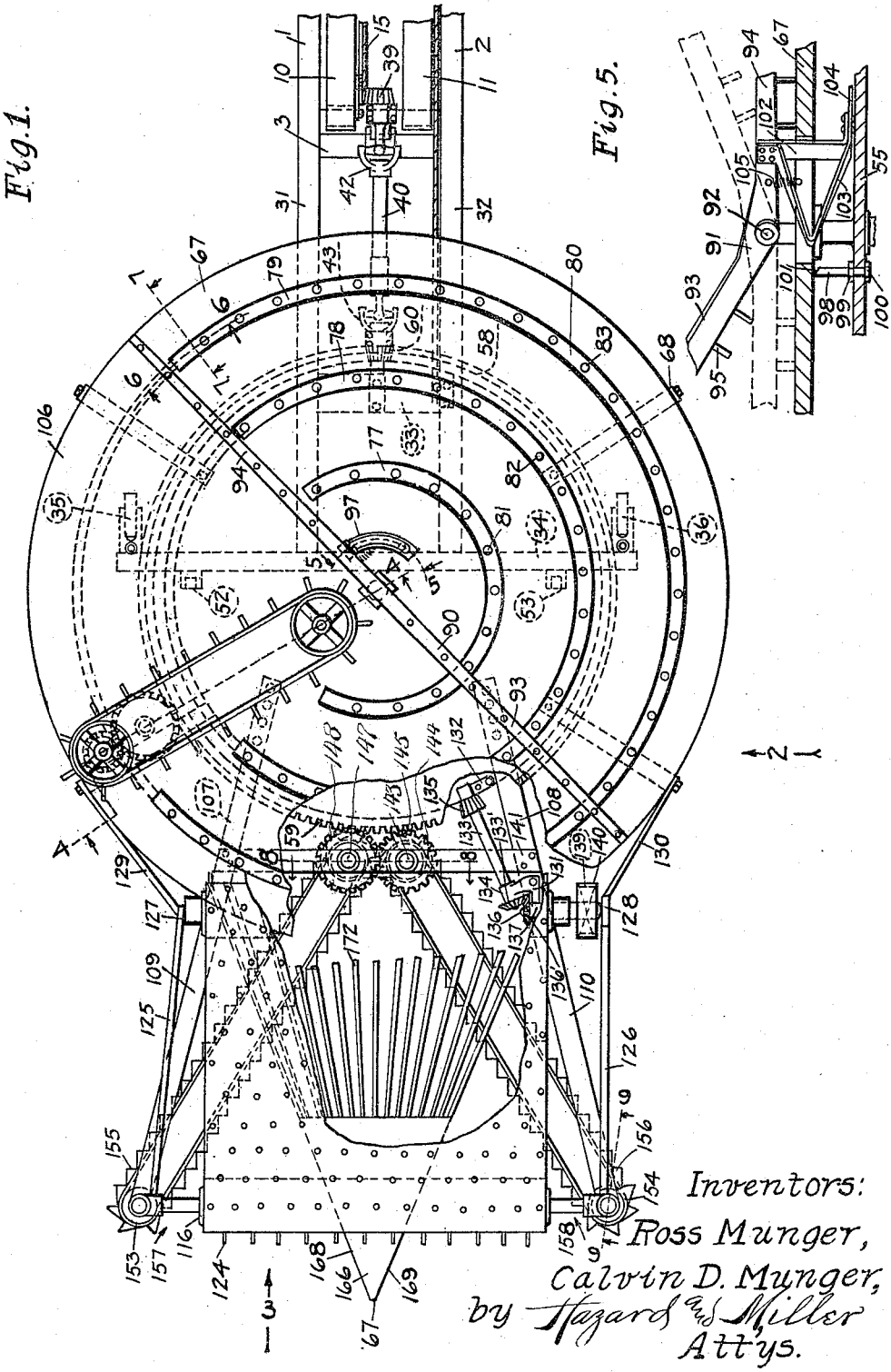

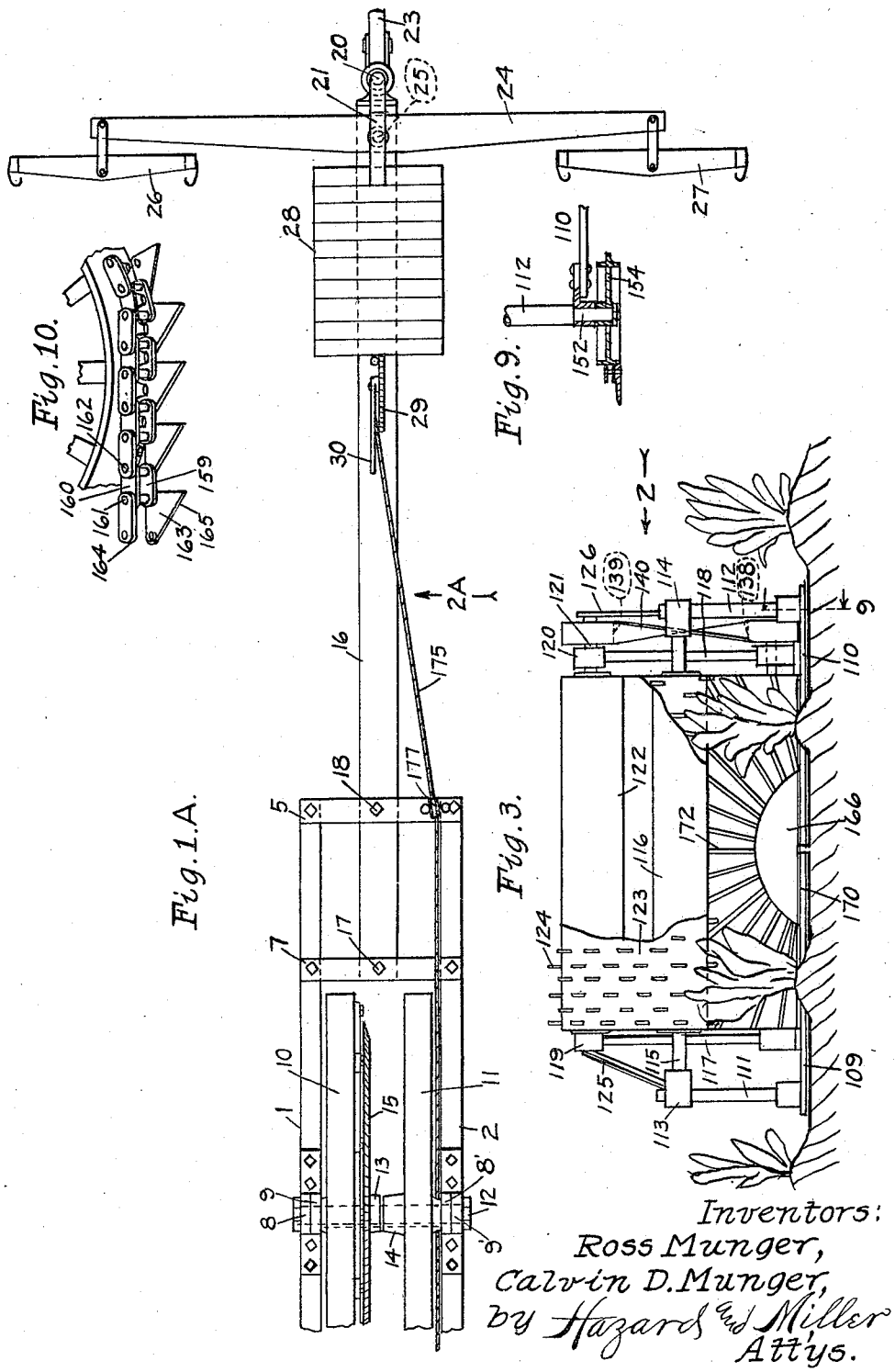

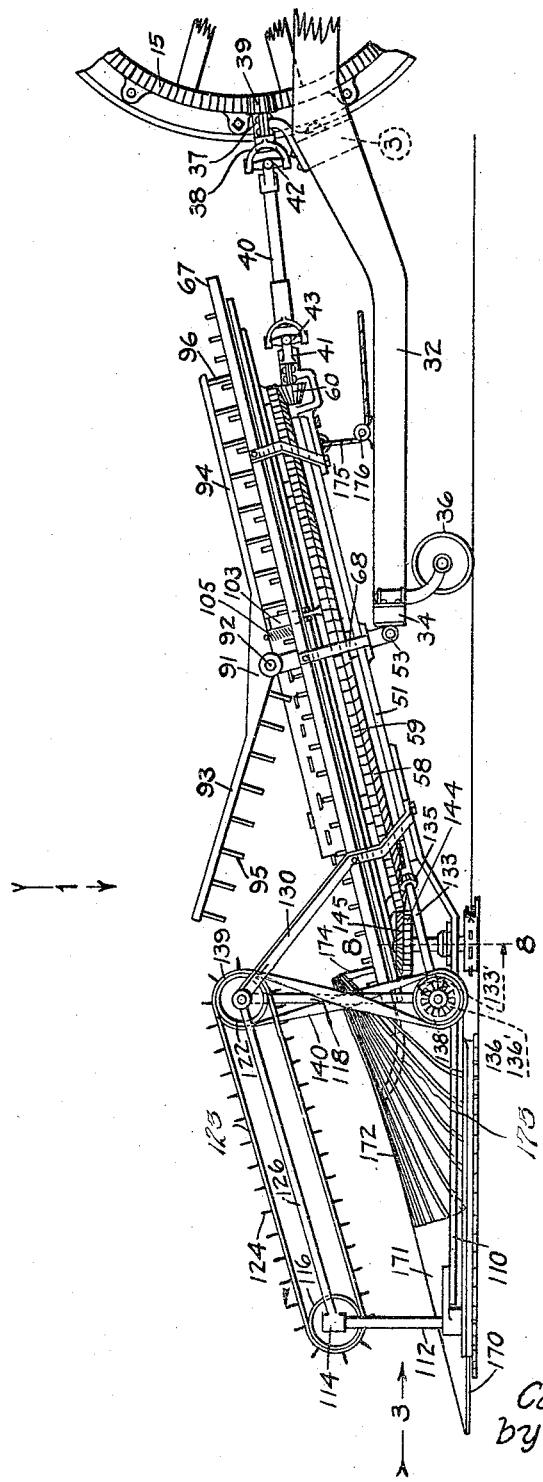
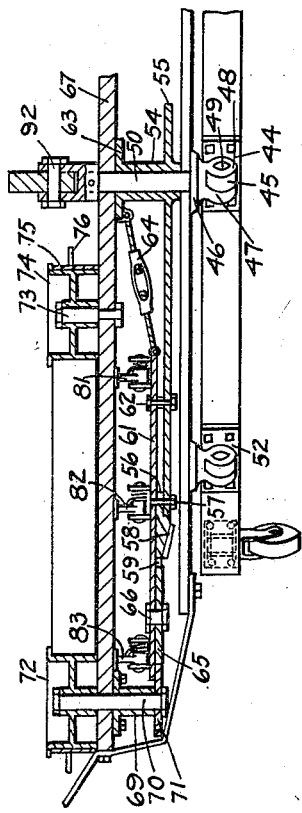

UNITED STATES PATENT OFFICE.

ROSS MUNGER AND CALVIN D. MUNGER, OF EL TORO, CALIFORNIA.

BEAN-HARVESTER.

1,295,822.  Specification of Letters Patent.  Patented Feb. 25, 1919.

Application filed March 23, 1918. Serial No. 224,329.

*To all whom it may concern:*

Be it known that we, Ross MUNGER and CALVIN D. MUNGER, citizens of the United States, residing at El Toro, in the county of Orange and State of California, have invented new and useful Improvements in Bean-Harvesters, of which the following is a specification.

Our object is to make a bean harvester and our invention consists in the novel features herein shown, described and claimed.

Figures 1 and 1A together form a top plan view of a bean harvester embodying the principles of our invention, as indicated by the arrows 1 and 1A in Figs. 2 and 2A.

Figs. 2 and 2A together form a side elevation, as indicated by the arrows 2 and 2A in Figs. 1 and 1A.

Fig. 3 is a front elevation as indicated by the arrows 3 in Figs. 1 and 2.

Fig. 4 is a fragmentary vertical sectional detail on the line 4—4 of Fig. 1.

Fig. 5 is a fragmentary vertical sectional detail on the line 5—5 of Fig. 1.

Fig. 6 is a fragmentary vertical section on the line 6—6 of Fig. 1.

Fig. 7 is a fragmentary sectional detail on the lines 7—7 of Figs. 1 and 6.

Fig. 8 is a sectional detail on the lines 8—8 of Figs. 1 and 2.

Fig. 9 is a sectional detail on the line 9—9 of Fig. 1.

Fig. 10 is a fragmentary perspective showing the detail construction of the chain sickles.

The main frame includes parallel side bars 1 and 2, each of said bars being preferably two square or rectangular timbers, abutting together, end to end, the shaft support 3 connecting the forward ends of the side bars 1 and 2, the lower strap 4 and the upper strap 5 connecting the rear ends of the side bars 1 and 2, and the lower strap 6 and upper strap 7 connecting the side bars 1 and 2 some distance in front of the straps 4 and 5.

Axle bearings 8 and 9 and 8' and 9' are mounted upon the abutting ends of the timbers of the side bars 1 and 2 and overlap. The traction wheels 10 and 11 are mounted upon the axle 12 between the side bars 1 and 2, the axle 12 being mounted in the bearings 8 and 9 and 8' and 9'. The hubs 13 and 14 of the wheels 10 and 11 butt together so as to hold the rims of the wheels spaced apart. A bevel gear 15 is secured to the inner face of the rim of the wheel 10.

A tongue 16 is mounted between the straps 6 and 7 and 4 and 5 and centrally between the rear ends of the side bars 1 and 2 and is secured in place by bolts 17 and 18 and the tongue 16 extends backwardly from the main frame a considerable distance. A steering post bearing 19 is fixed upon the rear end of the tongue 16, a steering post 20 is mounted in the bearing 19, a hand-lever 21 is fixed upon the upper end of the steering post, and a caster wheel fork 22 extends downwardly from the lower end of the steering post 20 and carries a caster wheel 23. An evener 24 is mounted upon the rear end of the tongue 16 and connected to the tongue by a clevis and pin 25. Swingletrees 26 and 27 are connected to the ends of the evener. An operator's platform 28 is built upon the tongue 16 directly in front of the evener 24. A sector 29 is mounted upon the tongue 16 directly in front of the platform 28 and a sector hand-lever 30 extends upwardly from the sector, so that the operator standing upon the platform 28 may manipulate the hand-lever 21 to guide the harvester and manipulate the sector hand-lever 30 to control the operating mechanism.

The extension frame comprises side bars 31 and 32 extending forwardly and downwardly from the forward ends of the side bars 1 and 2, a block 33 connecting the intermediate portions of the extension side bars 31 and 32, and the cross bar 34 connecting the extreme forward ends of the extension side bars 31 and 32 and extending some distance both ways beyond said side bars.

Caster wheels 35 and 36 support the ends of the cross bar 34. The caster wheels 35 and 36 serve to support the harvesting mechanism and to hold the main frame from tipping sidewise, said caster wheels being a considerable distance apart.

The bearing 37 is mounted upon the shaft support 3 and the rear end section 38 of the shaft is mounted in this bearing. A bevel pinion 39 is mounted upon the rear end of the section 38 and meshes with the bevel gear 15 so that as the harvester advances with the wheel 10 running upon the ground the pinion 39 is driven. The intermediate shaft section 40 is connected to the rear section 38 and the forward section 41 is connected to the forward end of the section 40 so as to make a flexible and extensible shaft of three pieces having two universal joints 42 and 43. The ends of the shaft section 40 are squared and slidingly mounted in the sockets of the joints 42 and 43 so as to make the shaft extensible and contractible as required in tilting the platform 67.

A bearing block 44 is secured at the center of the front face of the cross bar 34. A bearing 45 extends forwardly from the bearing block 44. A supporting plate 46 has bearings 47 and 48 extending downwardly upon opposite sides of the bearing 45, said bearings 45, 47 and 48 being connected by a pin 49. A post 50 extends upwardly from the supporting plate 46.

A circular base 51 is mounted upon the post 50, the post extending through the center of the base, and hinges 52 and 53 connect the base 51 to the cross bar 34, said hinges 52 and 53 being in transverse alinement with the hinge pin 49 so that the base 51 will rock back and forth on an axis parallel with the cross bar 34. A hub 54 is rotatably mounted upon the post 50 above the base 51. A web 55 extends from the hub 54. A ring 56 fits against the edge of the web 55 and overlaps the side of the web and is secured in place by bolts 57. A bevel gear 58 is formed upon the lower side of the ring 56 and a spur gear 59 is formed upon the outer periphery of the ring. The bevel pinion 60 upon the forward end of the shaft meshes with the bevel gear 58 so that the rotation of the shaft drives the bevel gear. An annular plate 61 is placed on top of the ring 56 and extends a considerable distance inwardly and outwardly from said ring and is secured in place by the bolts 57 and bolts 62. The web 55 extends from the lower end of the hub 54 and a flange 63 extends from the upper end of the hub. Turnbuckle rods 64 connect the flange 63 to the inner edge of the plate 61 so as to hold the plate from sagging. An idler gear 65 is mounted upon a stub shaft 66 fixed through the plate 61 and the idler meshes with the spur gear 59. The platform 67 is mounted upon the post 50 above the hub 54 and extends a considerable distance beyond the periphery of the spur gear 59. Braces 68 are rigidly secured to the base 51 and extend outwardly and upwardly and are secured to the periphery of the platform 67 so as to support the platform 67 upon the base 51. A bearing 69 is secured to the lower face of the platform 67 near its edge, a shaft 70 is mounted through the bearing, a spur gear 71 is fixed upon the lower end of the shaft in mesh with the idler 65, and a belt wheel 72 is fixed upon the upper end of the shaft so that as the gear 59 rotates the wheel 72 is rotated. A stub shaft 73 is fixed through the platform 67 near its center and a second belt wheel 74 is rotatably mounted upon this stub shaft. A discharging rake belt 75 runs around the wheels 72 and 74 and carries rake teeth 76. The discharging rake belt 75 runs back and forth radially across the platform 67 in position to discharge the beans from the platform. Concentric slots 77, 78 and 79 are formed through the platform 67, said slots beginning in front of the discharging rake belt 75 and extending substantially three-quarters of the way around the platform. The platform rake 80 consists of rows of pivoted rake teeth 81, 82 and 83 mounted to extend through the slots 77, 78, and 79. Referring to Figs. 6 and 7, bearings 84 and 85 extend upwardly from the plate 61, a shaft 86 is mounted in the bearings, a rake tooth 83 has a hub 87 mounted upon the shaft 86, and a spring 88 is mounted upon the shaft 86, one end of the spring being connected to a bearing 84 and the other end to a tooth 83 and the teeth 83 extend upwardly through the slot 79 a considerable distance so that as the plate 61 rotates, the teeth extend upwardly through the slot from the beginning of the slot in front of the discharging rake belt 75 around to the end of the slot and then at the end of the slot the teeth strike a wear plate 89 secured to the lower face of the platform 67 and the teeth swing downwardly and pass under this plate 89 until they come to the beginning of the slot again. In a like manner the teeth 81 and 82 are mounted to operate in the slots 77 and 78. The piling rake 90 comprises a head 91 pivotally connected to the upper end of the post 50 by a pin 92, arms 93 and 94 extending diametrically through the head 91, and teeth 95 and 96 extending from the arms. The arms 93 and 94 are in a plane perpendicular to the platform but stand at angles of about thirty degrees relative to each other in side elevation, as shown in Fig. 2, so that when the arm 94 is down parallel with the platform 67 the arm 93 is up and vice versa. A segmental slot 97 is formed through the platform 67 concentric with the post 50. A stud 98 has a shoulder 99 and the stud is inserted downwardly through the web 55 until the shoulder strikes the web, and a nut 100 is placed upon the lower end of the stud below the web. The upper end of the stud 98 is beveled to form a cam 101, said cam being in vertical alinement with the slot 97. A cam arm 102 is fixed to the rake arm 94 and extends downwardly through the slot 97. A cam 103 extends outwardly and upwardly from the lower end of the cam arm 102 in position to be engaged by the cam 101 and a bearing plate 104 extends horizontally from the lower end of the cam 103, so that as the web 55 rotates the cam 101 will strike the cam 103 and press the arm 94 upwardly to swing the arm 93 downwardly and the bearing plate 104 will ride over the cam 101 and hold the arm 94 upwardly during the time that the cam 101 is in contact with the bearing plate. A retractile coil spring 105 connects the arm 94 to the platform 67 so that the arm 94 is withdrawn to its normal horizontal position as soon as the cam 101 passes beyond the plate 104. The space 106 upon the platform 67 behind the discharging rake belt 75 is smooth to the ends of the slots 77, 78 and 79 and the piling rake 90 is arranged across the platform 67 so that the arm 94 is at the opposite side of the space 106 from the discharging rake belt 75. The piling rakes stand at an angle of about thirty degrees relative to the cross bar 34 and the space 106 extends about equal distances each side of the cross bar.

Supporting arms 107 and 108 are secured at their rear ends to the bottom of the base 51 and extend forwardly and downwardly and the frame bars 109 and 110 extend horizontally and forwardly from the lower ends of these supporting bars. Posts 111 and 112 extend upwardly from the forward ends of the frame bars 109 and 110 and bearings 113 and 114 are fixed upon the upper ends of the posts 110 and 111. A shaft 115 is mounted in the bearings 113 and 114 and an apron roller 116 is fixed upon the shaft 115. Posts 117 and 118 extend upwardly from the frame bars 109 and 110 near their rear ends. Bearings 119 and 120 are fixed to the upper ends of the posts. A shaft 121 is mounted in these bearings 119 and 120 and a second apron roller 122 is fixed upon the shaft. An apron 123 runs around the rollers 116 and 112 and carries teeth 124. Braces 125 and 126 connect the upper ends of the posts 111 and 112 to bearings 127 and 128 upon the outer ends of the shaft 121 and braces 129 and 130 connect the bearings 127 and 128 to the upper ends of the adjacent braces 68 upon the platform 67. A bearing block 131 is mounted upon the frame bar 110. A bearing 132 is mounted upon the base 51. A shaft 133 is mounted in the bearings 134 upon the bearing block 131 and in the bearing 132. A bevel pinion 135 is fixed upon one end of the shaft 133 in mesh with the bevel gear 58. A shaft 136 is mounted in a bearing 137 in the bearing block 131 and carries a belt pulley 138. A similar pulley 139 is fixed upon the shaft 121 and a belt 140 runs over the pulleys 138 and 139, so that as the bevel gear 58 operates, the apron 123 is operated, there being a bevel gear 133' upon the shaft 133 meshing with a bevel gear 136' upon the shaft 136. A cross bar 141 connects the rear ends of the frame bars 109 and 110. A bearing 142 is mounted vertically upon the cross bar 141, a shaft 143 is mounted in the bearing, a spur gear 144 is fixed upon the upper end of the shaft, and a bevel gear 145 is formed integral with the spur gear, said bevel gear 145 being in mesh with the spur gear 59. A bearing 146 similar to the bearing 142 is fixed upon the cross bar 141, a shaft 147 extends through the bearing, and a spur gear 148 is fixed upon the upper end of the shaft 147 in mesh with the spur gear 144. Sprocket wheels 149 and 150 are fixed upon the lower ends of the shafts 143 and 147 below the cross bar 141. A pintle 152 is formed upon the lower end of the post 112 and a similar pintle is formed upon the lower end of the post 111 and said pintles extend below the frame bars 109 and 110 and sprocket wheels 153 and 154 are mounted upon these pintles. Chain sickles 155 and 156 are mounted upon the sprocket wheels 153 and 149, and 154 and 150, respectively, so that as the spur gear 59 rotates the chain sickles 155 and 156 are driven in the direction indicated by the arrows 157 and 158. The chain sickles 155 and 156 are substantially alike and are constructed as shown in detail in Fig. 10. The short links 159 and 160 are spaced apart by the pivot pins 161 and 162 and the sickle section 163 is placed opposite to the long link 164. The sickle section 163 is substantially a right-angled triangle and its long side is ground to make a cutting edge 165.

The divider 166 is A-shaped in plan and its point 167 is adapted to pass between two rows of beans and its inclined sides 168 and 169 are adapted to separate the vines of one row from the other and guide the vines backwardly and outwardly toward the sickles 155 and 156. This divider 166 is wedge-shaped in side elevation, as seen in Fig. 2, with its lower side 170 flat upon the ground and its upper side 171 inclined upwardly and backwardly. At the rear end of the divider 166 are slats 172 forming a stationary open apron in opposition to the traveling apron 123, said apron 172 leading over on to the platform 67. The divider 166 and the stationary apron 172 are built together and form a prow and are connected to the platform 67 by beams 173 and 174.

A cable 175 is connected to the rear end and bottom of the base 51 and extends downwardly under a guide pulley 176 on the block 33 and then backwardly under the main frame under a guide roller 177 and is attached to the hand-lever 30, so that by throwing the hand-lever 30 backwardly the cable is pulled downwardly upon the rear end of the base 51 and will raise the prow and cutting mechanism from the ground.

In operation, the hand-lever 30 is thrown forwardly and the prow and cutting mechanism rest upon the ground. The harvester is to be propelled by hitching draft animals to the swingle-trees 26 and 27 with their heads toward the front of the machine. The operator will guide the machine by manipulating the hand-lever 21 so that the divider 166 will pass centrally between two rows of beans and the chain sickles will run upon the surface of the ground or even cut below the surface so as to sever the bean vines completely from the ground and the bean vines will be forced inwardly by the action of the chain sickles and will fall upon the stationary apron 172 and be drawn upwardly and backwardly by the action of the movable apron 123. All the gravel, dirt, and foreign matter will fall through the slats and the bean vines will be finally discharged from the apron onto the platform 67. As the harvester is moved forwardly the rotation of the wheel 10 will operate the bevel gear 15 to drive the flexible and extensible shaft and drive the bevel gear 58 and rotate the plate 61. The spur gear 59 is carried with the bevel gear 58 and drives the discharge rake belt 75. The operation of the spur gear 59 also operates the chain sickles and the operation of the bevel gear 58 drives the apron 123. As the bean vines pass upon the platform 67 the teeth 81, 82 and 83 carried by the plate 61 will move the vines around upon the platform and pile the vines up against the arm 94 until the cam 103 is operated by the cam 101 to raise said arm 94. Then the pile of beans will pass under the arm 94 to the smooth surface 106 and will be discharged by the action of the discharge rake belt 75 and teeth 76. While the arm 94 is elevated the arm 93 is down and the vines are piled up against the arm 93 for an instant and while the arm 93 is down the teeth 95 will hold the vines and the action of the teeth 81, 82 and 83 beyond the arm 93 will tear the vines apart so as to separate the two piles. As soon as the head pile is discharged the operation of the arms 93 and 94 is reversed.

Various changes may be made in the details of construction without departing from the spirit of our invention as claimed.

We claim:

1. A bean harvester comprising a main frame, an extension frame rigid with the main frame, a drive wheel supporting the main frame, caster wheels supporting the extension frame, a rigid tongue extending backwardly from the main frame and hinged to swing up and down, a steering wheel supporting the tongue, a steering post for operating the steering wheel, draft mechanism connected to the rear end of the tongue, a platform pivotally connected on a transverse axis to the forward end of the extension frame, a pointed prow extending forwardly from the platform and adapted to run upon the ground, chain sickles mounted to travel on diagonal lines on each side of the prow and upon the ground, a conveying apron mounted above the prow and discharging onto the platform, a bevel gear mounted below the platform, a bevel gear upon the drive wheel, pinions and a flexible and extensible shaft connecting the bevel gear upon the drive wheel to the bevel gear upon the platform, a spur gear carried by the bevel gear upon the platform, connections between the spur gear and the chain sickles for driving the sickles, connections between the bevel gear upon the platform and the apron for driving the apron, a plate carried by the bevel gear upon the platform, platform rake teeth carried by the plate and extending through the platform, a piling rake pivotally mounted above the platform, means for operating the piling rake, a discharge rake mounted upon the platform, and means for driving the discharge rake.

2. In a bean harvester, a jointed main frame, an extension frame rigid with one part of the jointed main frame, a drive wheel supporting the main frame, caster wheels supporting the extension frame, a platform pivotally connected on a transverse axis to the forward end of the extension frame, a pointed prow extending forwardly from the platform and adapted to run upon the ground, chain sickles mounted to travel on diagonal lines on each inclined side of the prow and upon the ground, so that the material cut by the sickles will fall upon the prow, and means for driving the sickles.

3. In a bean harvester, a platform, a plate rotatably mounted under the platform, means for operating the plate, platform rake teeth carried by the plate and extending through the platform, a piling rake pivotally mounted above the platform, means for operating the piling rake, a discharge rake mounted upon the platform, and means for driving the discharge rake.

4. In a bean harvester, a main frame, drive wheels supporting the main frame, an extension frame extending forwardly from the main frame, caster wheels supporting the forward end of the extension frame, a platform pivotally mounted upon the forward end of the extension frame on a transverse axis, cutting mechanism extending forwardly from the platform, delivery mechanism to receive the bean vines from the cutting mechanism and discharge the bean vines upon the platform, means for separating the bean vines into piles upon the platform, and means for discharging the piles from the platform.

5. In a bean harvester, a pointed prow adapted to run upon the ground, chain sickles adapted to run upon the ground on lines diagonal of the sides of the prow, means for moving the bean vines from the prow, means for separating the bean vines into piles, and means for discharging the piles.

In testimony whereof we have signed our names to this specification.

ROSS MUNGER.
CALVIN D. MUNGER.

Copies of this patent may be obtained for five cents each, by addressing the "Commissioner of Patents, Washington, D. C."